Jan. 25, 1938. T. M. WALKER 2,106,670
ANTISKID OVERSHOE
Original Filed June 18, 1935
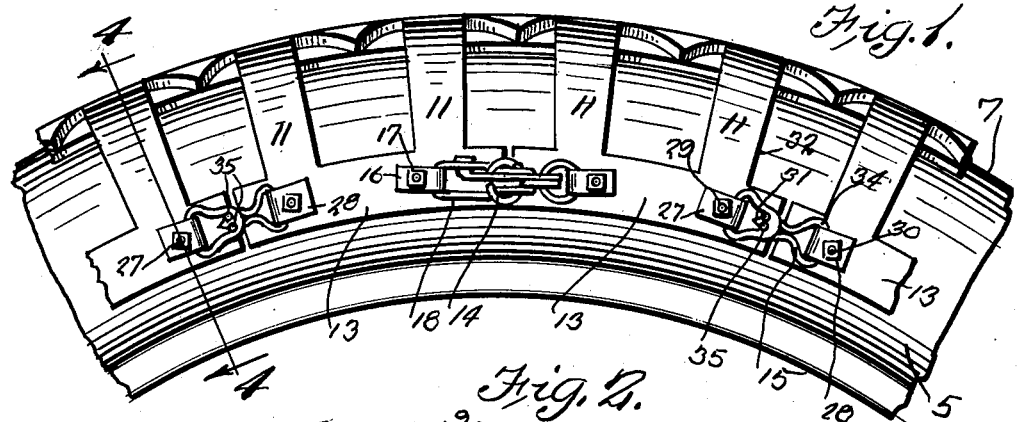
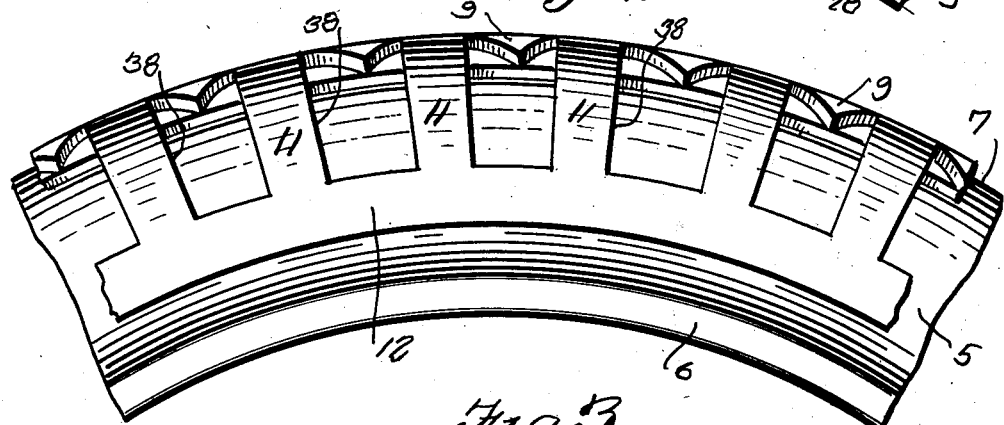
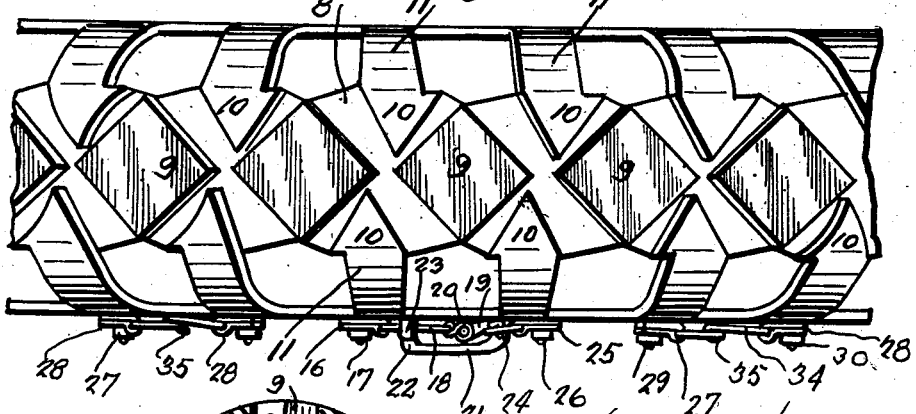
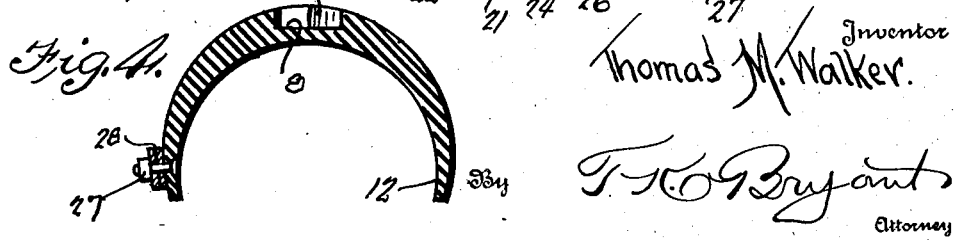
Inventor
Thomas M. Walker.
By T. K. O. Bryant
Attorney

Patented Jan. 25, 1938

2,106,670

UNITED STATES PATENT OFFICE 2,106,670

ANTISKID OVERSHOE

Thomas M. Walker, Auburn, N. Y.

Substitute of application Serial No. 27,256, June 18, 1935. This application October 11, 1937, Serial No. 168,523

1 Claim. (Cl. 152—16)

This invention relates to certain new and useful improvements in anti-skid overshoes.

The primary object of this invention is to provide an anti-skid overshoe adapted to be attached to a pneumatic tire in lieu of the usual anti-skid chains or similar metallic devices, the overshoes preferably being of rubber or rubber and fabric construction and carrying anti-skid elements or projections of like material that are effective to prevent skidding on ice or snow as well as wet pavements and which will also operate on dry pavements without undue wear thereon as compared with the usual chains.

A further object of this invention is to provide an anti-skid and re-tread member capable of being applied to a pneumatic tire after the tread of the tire has worn smooth and said device may remain upon the pneumatic tire during the remainder of the tire life.

A still further object of this invention is to provide an anti-skid device and re-tread member for pneumatic tires having a pair of circumferential retaining rings, one of which is divided into sections and the other being continuous whereby said device may be easily applied to and removed from a pneumatic tire.

A still further object of this invention is to provide a device of the above mentioned character having spaced openings for the admission and entrance of air whereby friction will be decreased and air may gain entrance to the tread surface and the covered surface of the pneumatic tire prevents over-heating.

A still further object of this invention is to provide a device of the above mentioned character in which the tread straps are arranged in staggered relation in order to add to the tread gripping qualities for preventing slippage of the tread with respect to the pneumatic tire with the resultant decrease in friction therebetween.

Other objects and advantages of the invention will become apparent during the course of the following description, taken with the drawing, wherein, Figure 1 is a side elevational view of the device embodying this invention illustrating the front thereof and showing the manner in which the divided sections of the circumferential band are connected;

Figure 2 is a side elevational view illustrating the rear and undivided circumferential retaining band;

Figure 3 is a top elevational view showing in detail the arrangement of the re-tread surface; and Figure 4 is a transverse cross-sectional view taken on line 4—4 of Figure 1, looking in the direction of the arrows, showing the cross-sectional configuration of the anti-skid and re-tread members.

In the drawing, wherein for the purpose of illustrating the invention and wherein like reference characters will be employed to designate like parts throughout the same, the reference character 5 will generally be employed to designate a pneumatic tire having a rim bead 6 and a tread portion 7.

The invention comprises a circumferential band 8 preferably formed of fabric and rubber adapted to be positioned on the tread 7 of the tire 5.

The circumferential band 8 is provided at spaced intervals with square projections 9 forming anti-skid traction elements adapted to prevent longitudinal and lateral skidding.

Arranged on the circumferential band 8 between the square projections 9 in staggered relation is a series of triangular-shaped projections 10 adapted to assist in preventing skidding both longitudinally and laterally. The triangular-shaped projections 10 are formed integral with connecting straps 11 which depend downwardly from the tread of the tire in an uneven or staggered manner.

On one side of the anti-skid device, the connecting straps 11 are adapted to be secured or formed integral with a continuous band 12 which is of a smaller diameter than the continuous band 8 to cause the anti-skid device to closely fit the tread 7 of the tire 5.

The other set of downwardly depending connecting straps 11 is secured to an interrupted band comprising sections 13, the ends of which are provided with fastening elements which will be hereinafter fully described.

It is proposed to connect at least two downwardly depending straps 11 to each divided section 13 and each divided section may be connected together by means of at least three tighteners 14 at spaced intervals between the detachable fasteners 15.

Each tightener 14 comprises a metal strap 16 secured to an end of one of the sections 13 by means of a fastening element 17 and secured in the metal loop 16 is a link 18, to one end of which is suitably secured a hook member 19 as at 20 having an arm or tightening lever 21 pivoted thereto so that the free end 22 of the lever may have its hooked portion 23 engaging the link 18. The lever 21 is adapted to pass through a loop or ring 24 pivotally secured to the adjacent interrupted section 13 by means of a looped strap 25 held in place by a nut bolt 26.

The strap tightener above described is of a conventional form but it is to be noted that the hooked end 23 is locked in place by means of the interrupted sections 13, being in close engagement therewith whereby unlocking and detaching of the tightener will be prevented.

It is intended to provide the interrupted band 13 with three or more tighteners 14 arranged at equidistant points with respect to the circumference of the band and between the equi-distant spaced tighteners 14 there are provided separable fasteners 15 which comprise metal strap loops 27 and 28 connected to the free ends of the sections 13 by means of nuts and bolts 29 and 30 respectively. A triangular shaped loop 31 is secured to the looped portion of the strap 27 and formed on the outer end of the triangular-shaped loop 31 is an inwardly extending projection 32 which is more or less arrowhead-shaped for receiving the double hooked member 34 secured to the metal strap loop 28 on the adjacent section 13. The free ends of the double hook member 34 as at 35 are hook-shaped and are bent inwardly for preventing detachment thereof when the fastener is arranged in its operative position, but which may be easily separated by moving the members 31 and 34 angularly with respect to each other.

It is to be noted that the straps 11 form openings 38 at spaced intervals to allow air passage adjacent the circumferential band 8 and tire tread portion 7.

It is to be understood also, that the form of the invention herewith shown and described is to be taken as the preferred embodiment of the same and that various changes in the shape, size and arrangement of parts may be resorted to without departing from the spirit and scope of the invention as claimed.

I claim:—

An anti-skid overshoe of the character described, comprising an uninterrupted imperforate circumferential band, traction increasing elements formed integral with the band and projecting therefrom, laterally extending straps integral with the band on opposite sides thereof and arranged in staggered relation, a traction increasing element rising from the band at the inner end of each strap to reinforce the latter, a continuous band of a diameter smaller than the circumferential band connecting the lateral straps on one side of the circumferential band, strap sections connecting the other lateral straps, strap tighteners for certain strap sections and separable fasteners for connecting the remaining strap sections.

THOMAS M. WALKER.